A system for identifying users for entrance to an area comprising a point of entry into a pre-defined area. The system comprises a first computing device having a microprocessor, a memory and a screen disposed adjacent to the point of entry. There is also at least one second computing device having at least one microprocessor and at least one memory, said at least one second computing device being disposed remote from the first computing device. There is at least one third computing device having at least one screen and at least one microprocessor wherein the third computing device is in communication with the second computing device wherein the second computing device is configured to send at least one image to the first computing device and to the third computing device wherein when an image at the point of entry matches an image on the third computing device the port of entry will allow the user holding the third computing device into the point of entry.

US 11,704,953 B2

United States Patent
Alex et al.

(10) Patent No.: US 11,704,953 B2
(45) Date of Patent: Jul. 18, 2023

(54) SYSTEM AND PROCESS FOR AUTHENTICATING A USER IN A REGION

(71) Applicant: DIRECT TECHNOLOGY HOLDINGS INC, Roslyn Heights, NY (US)

(72) Inventors: Tony Alex, New York, NY (US); Michael Giannone, Levittown, NY (US); Peter J. Degen, Huntington, NY (US)

(73) Assignee: DIRECT TECHNOLOGY HOLDINGS INC, Roslyn Heights, NY (US)

( * ) Notice: Subject to any disclaimer, the term of this patent is extended or adjusted under 35 U.S.C. 154(b) by 370 days.

(21) Appl. No.: 16/940,929

(22) Filed: Jul. 28, 2020

(65) Prior Publication Data

US 2021/0142604 A1   May 13, 2021

Related U.S. Application Data

(60) Provisional application No. 62/932,330, filed on Nov. 7, 2019.

(51) Int. Cl.
*G07C 9/25* (2020.01)
*G06F 21/35* (2013.01)
(Continued)

(52) U.S. Cl.
CPC ............. *G07C 9/253* (2020.01); *G06F 21/32* (2013.01); *G06F 21/35* (2013.01);
(Continued)

(58) Field of Classification Search
CPC ................ G07C 9/253; G07C 9/00817; G07C 2009/00841; G07C 9/00571; G07C 9/28;
(Continued)

(56) References Cited

U.S. PATENT DOCUMENTS 5,283,644 A * 2/1994 Maeno ..................... H04N 7/18
                                                                              382/118
5,635,981 A * 6/1997 Ribacoff .................. G07C 9/37
                                                                              348/E7.086

(Continued)

*Primary Examiner* — Lewis G West
(74) *Attorney, Agent, or Firm* — Collard & Roe, P.C.

(57) ABSTRACT

13 Claims, 19 Drawing Sheets

(51) Int. Cl.
  *G07C 9/00* (2020.01)
  *H04W 4/80* (2018.01)
  *G06F 21/32* (2013.01)
(52) U.S. Cl.
  CPC .......... *G07C 9/00817* (2013.01); *H04W 4/80* (2018.02); *G07C 2009/00841* (2013.01)
(58) Field of Classification Search
  CPC .......... G06F 21/32; G06F 21/35; G06F 21/36; H04W 4/80; H04W 4/021
  See application file for complete search history.

(56) References Cited

U.S. PATENT DOCUMENTS

| | | | | |
|---|---|---|---|---|
| 6,313,872 B1* | 11/2001 | Borg | ............... | G08B 13/19695 348/155 |
| 6,504,470 B2* | 1/2003 | Puchek | ................ | G07C 9/23 340/5.53 |
| 6,554,705 B1* | 4/2003 | Cumbers | ............ | G06V 40/18 705/14.27 |
| 10,057,542 B2* | 8/2018 | Segal | ................ | H04L 12/1822 |
| 11,436,906 B1* | 9/2022 | Peddinti | .......... | G08B 13/19613 |
| 11,470,442 B2* | 10/2022 | Bontempo | .......... | H04L 12/1845 |
| 2002/0093425 A1* | 7/2002 | Puchek | ................ | G07C 9/23 340/541 |
| 2002/0094111 A1* | 7/2002 | Puchek | ................ | G07C 9/257 382/115 |
| 2004/0199785 A1* | 10/2004 | Pederson | ......... | G08B 13/19663 340/293 |
| 2005/0110610 A1* | 5/2005 | Bazakos | ............... | G08G 1/207 340/5.82 |
| 2006/0071791 A1* | 4/2006 | Meyers | ............... | G07B 15/063 340/572.1 |
| 2006/0093190 A1* | 5/2006 | Cheng | .................. | G06T 7/90 340/5.83 |
| 2006/0126905 A1* | 6/2006 | Loo | ..................... | G06V 40/166 382/118 |
| 2007/0216764 A1* | 9/2007 | Kwak | ................ | G07C 9/00309 348/14.06 |
| 2012/0081282 A1* | 4/2012 | Chin | ...................... | G06F 3/011 345/156 |
| 2014/0270383 A1* | 9/2014 | Pederson | ............... | G08G 1/207 382/104 |
| 2015/0325067 A1* | 11/2015 | Lee | ................... | G07C 9/00174 340/5.65 |
| 2015/0325091 A1* | 11/2015 | Hamilton | ................ | G07C 9/20 340/5.53 |
| 2016/0344091 A1* | 11/2016 | Trani | .................... | H01Q 1/243 |
| 2017/0142581 A1* | 5/2017 | Tarmey | ............... | G07C 9/00563 |
| 2018/0322268 A1* | 11/2018 | Grammer | ......... | G08B 13/19613 |
| 2019/0043281 A1* | 2/2019 | Aman | .................... | G07C 9/257 |
| 2019/0394196 A1* | 12/2019 | Gill | ....................... | G06V 40/197 |
| 2020/0357212 A1* | 11/2020 | Frey | ....................... | G07C 9/29 |

* cited by examiner

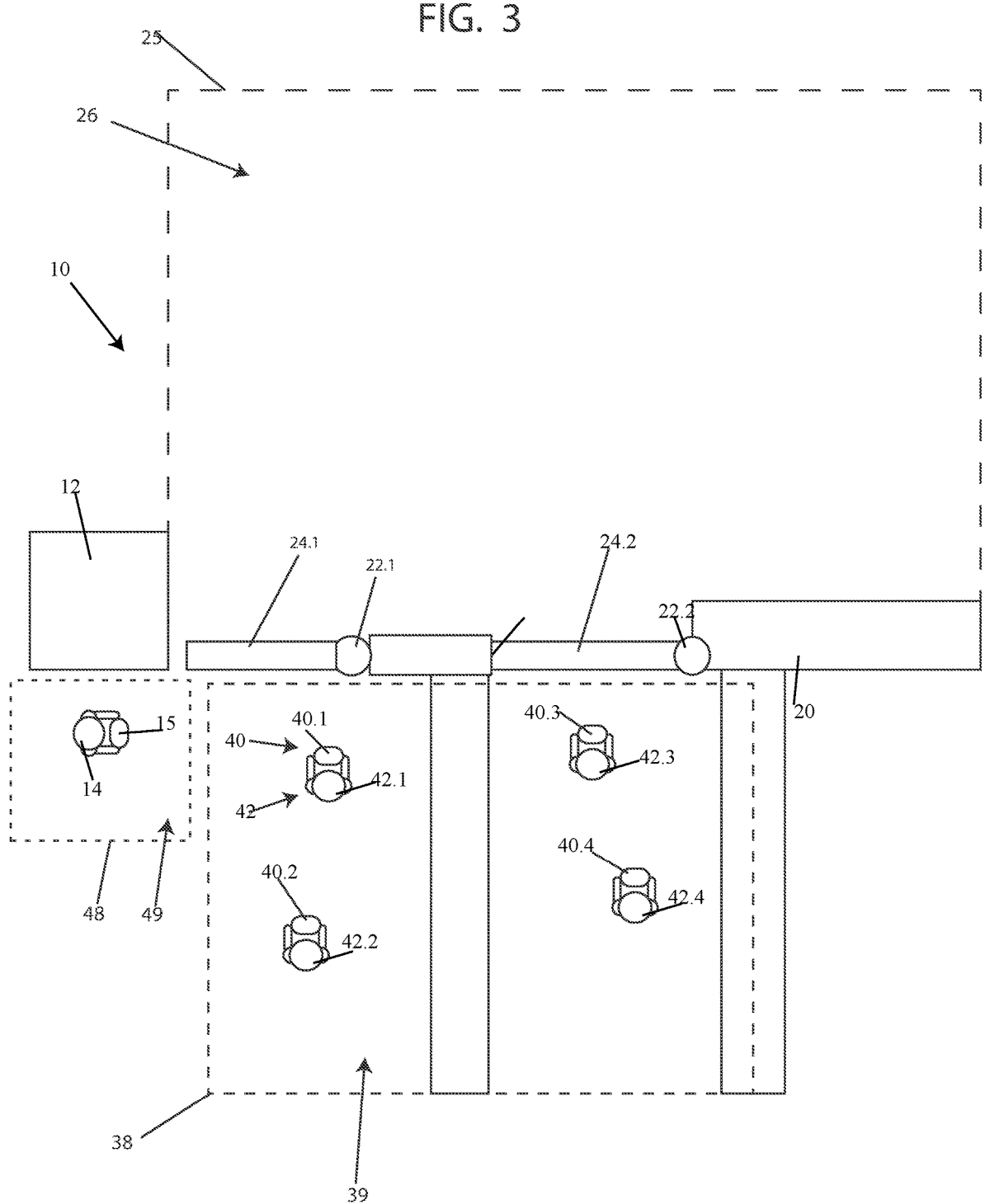

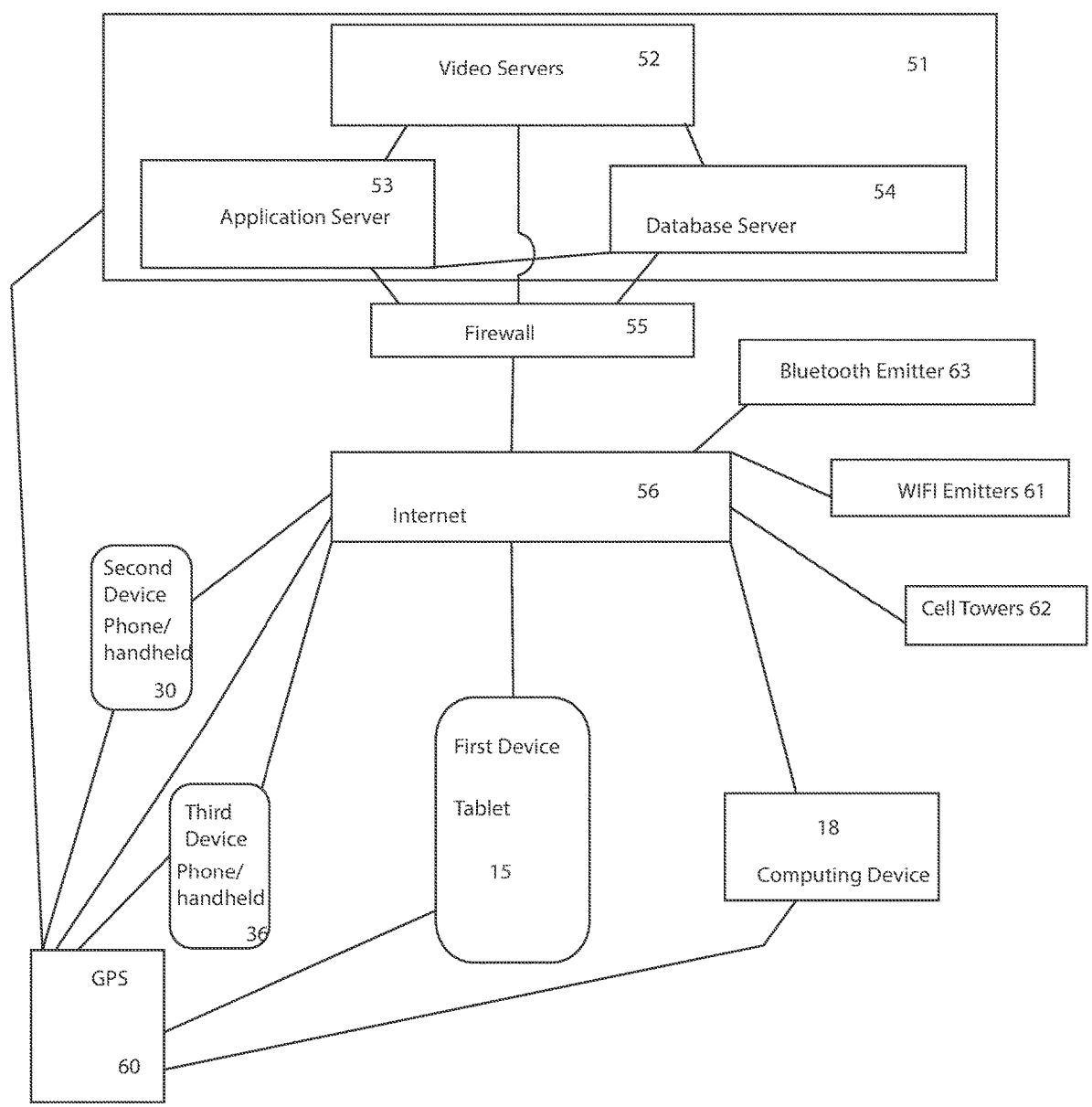

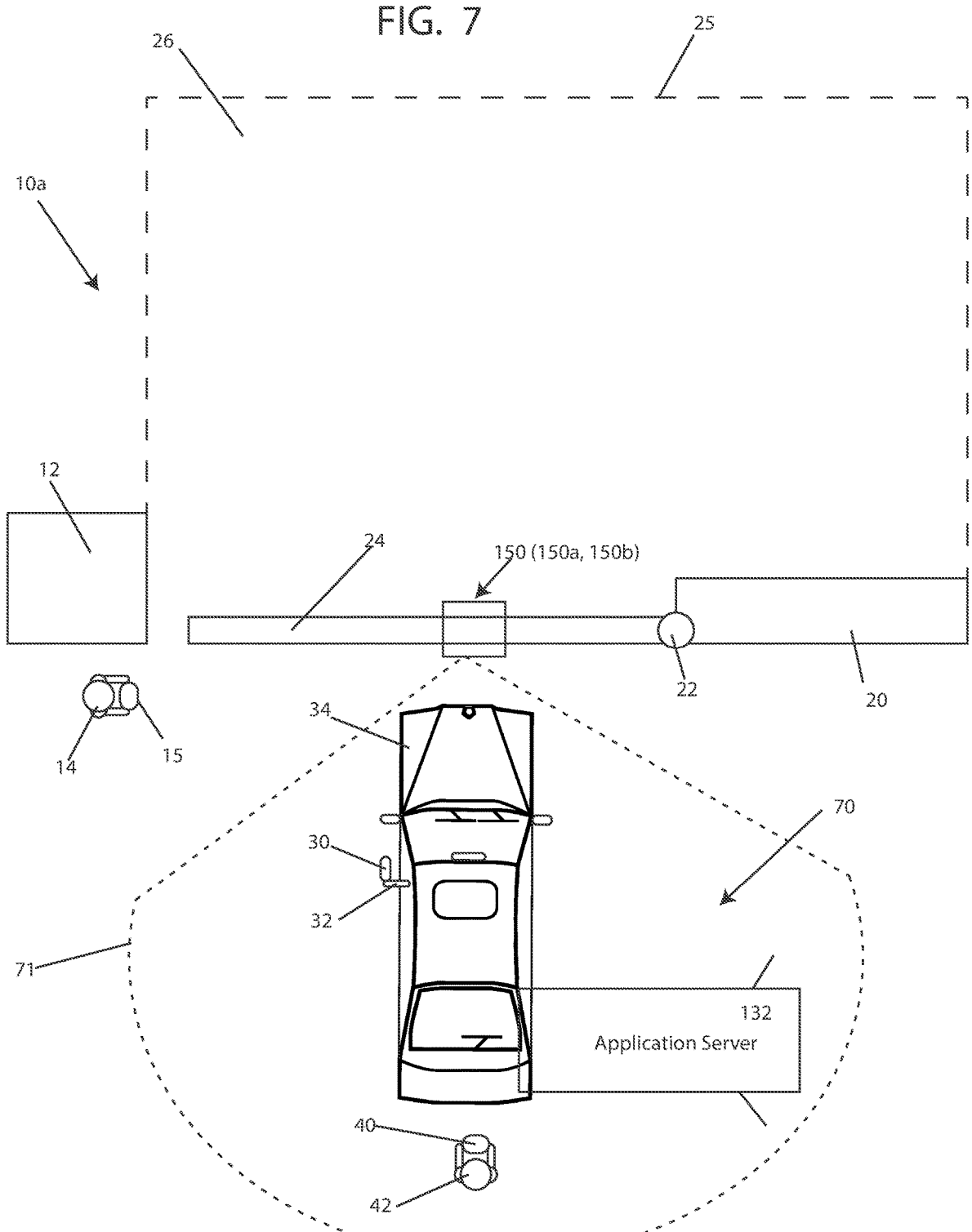

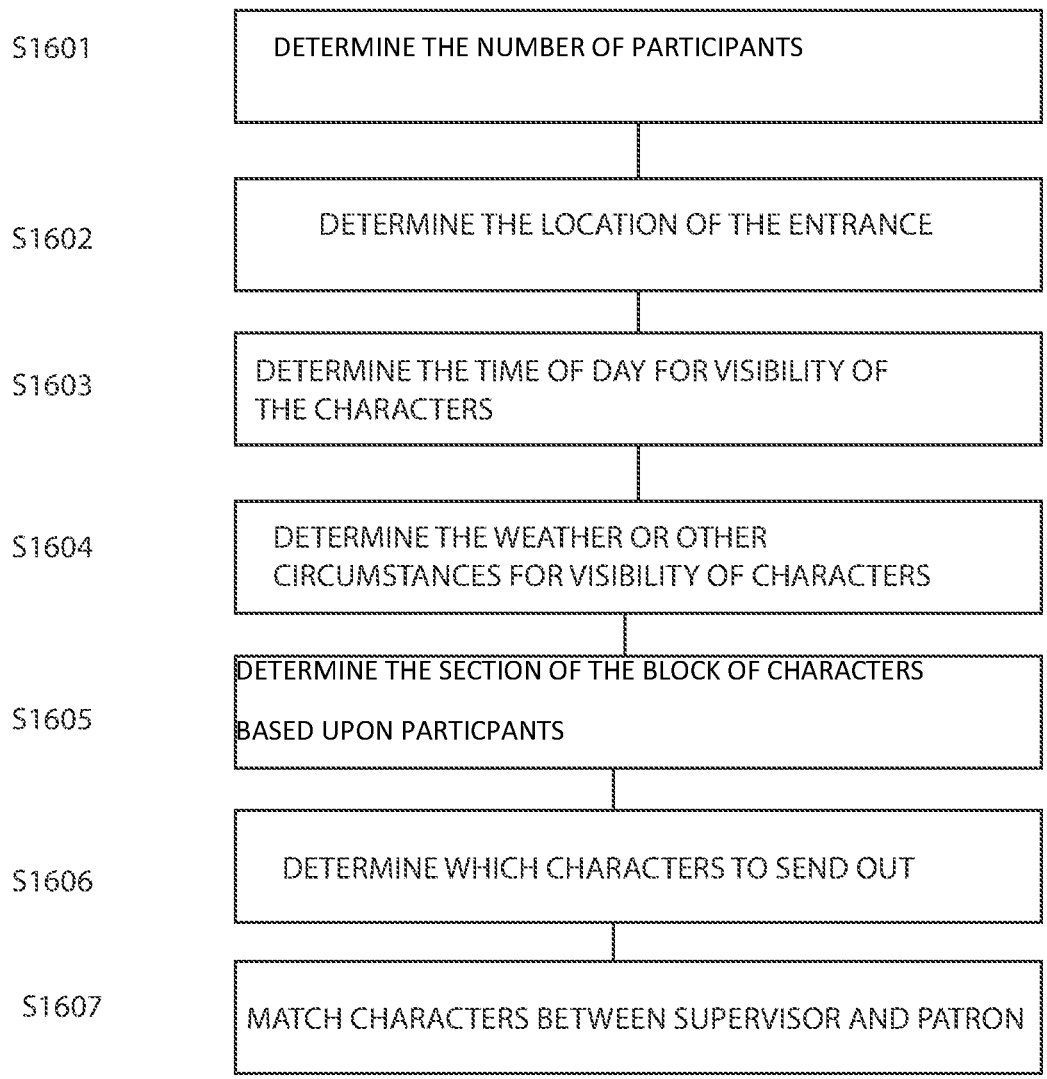

SYSTEM AND PROCESS FOR AUTHENTICATING A USER IN A REGION

CROSS REFERENCE TO RELATED APPLICATIONS

This application is a non-provisional application that claims priority from U.S. Provisional Application Ser. No. 62/932,330 filed on Nov. 7, 2019, the disclosure of which is hereby incorporated by reference.

BACKGROUND OF THE INVENTION

The invention relates to a system and process for authenticating a user in a region such as a park. Currently there can be a backlog at times for people who wish to enter a region such as a park. Therefore, there is a need for a system and process for authenticating a user in a region such as a park.

SUMMARY OF THE INVENTION

At least one embodiment of the invention relates to a system for identifying users for entrance to an area comprising a point of entry into a pre-defined area. The system comprises a first computing device having a microprocessor, a memory and a screen disposed adjacent to the point of entry. There is also at least one second computing device having at least one microprocessor and at least one memory, said at least one second computing device being disposed remote from the first computing device. There is at least one third computing device having at least one screen and at least one microprocessor wherein the third computing device is in communication with the second computing device wherein the second computing device is configured to send at least one image to the first computing device and to the third computing device wherein when an image at the point of entry matches an image on the third computing device the port of entry will allow the user holding the third computing device into the point of entry.

In addition, the system is designed to send unique images only after a customer is identified, such as when the customer is in the vicinity of a venue. Each of the images can be invalidated to prevent re-use.

The system is also configured to prevent the re-use of that particular set of images to create a substantially hack proof system.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIG. 3 is another plan view or a port of entry of individuals on foot;

FIG. 4 is a view of a computer network;

FIG. 7 is a plan view of another embodiment indicating a port of entry;

FIG. 16 is a flow chart for determining which characters to use for authentication of a person into a port of entry;

DETAILED DESCRIPTION OF PREFERRED EMBODIMENTS

Figure 1:
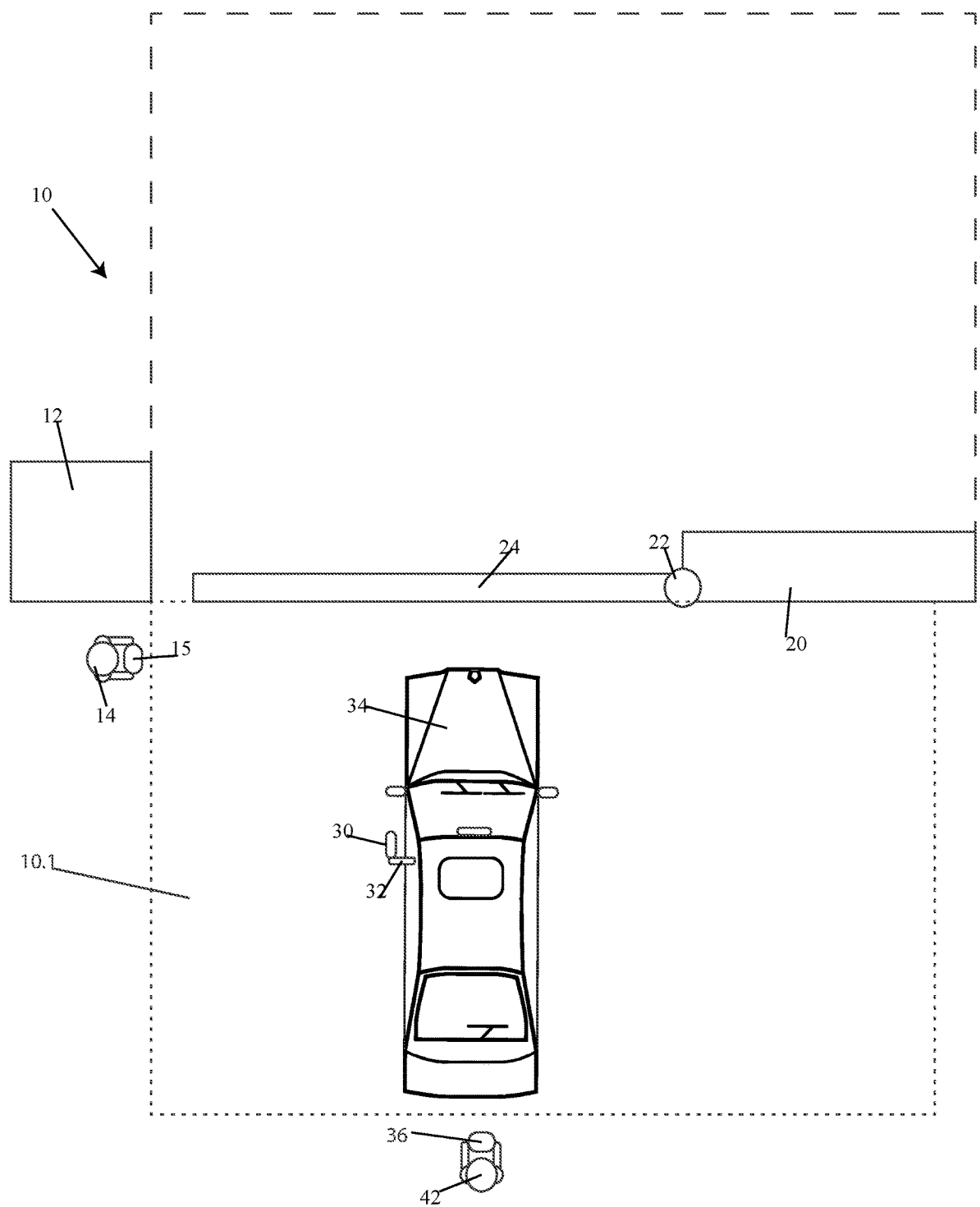
FIG. 1 is a view of the port of entry and the user attempting to gain entry into the port of entry.

Referring to the drawings, FIG. 1 shows a plan view of a port of entry using a system 10 which includes a station 12, a user/attendant 14 having a portable electronic device or tablet (hereinafter first device) 15, a barrier such as a wall 20, a gate drive 22, and a gate 24. The drive 22 is selectively actionable by the attendant 14, when the user/attendant 14 matches an image on a screen of the electronic device with an image presented by the user. This electronic device 15 can be in communication with a second device such as a server 51, in particular, application server 53. For example, there is at least one additional electronic device such as a smartphone hereinafter a third device 30 which is held by another user 32. This user can be positioned in a motor vehicle such as motor vehicle 34. This second device can be held by the user or affixed to the user's windshield in a manner shown in FIGS. 12A-12D.

Figure 2A:
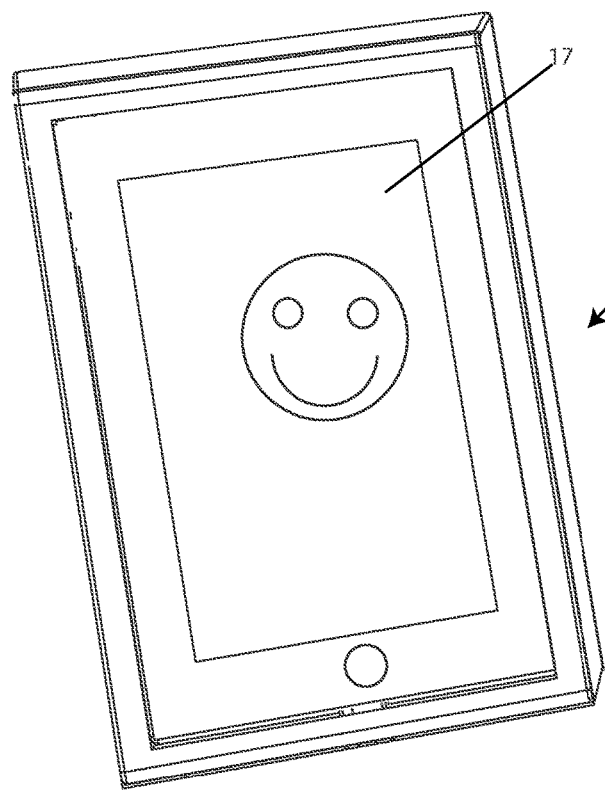
FIG. 2A is a first view of the matching computing devices.

In addition, there can be another portable electronic device or third device 36 which is owned by another user such as user 42 which is also present. Each of these electronic devices can be in communication with each other over a computer network (See FIG. 3) and be coordinated to show a particular image that matches on a first device 15, and third device 30. The other portable electronic device can also be a tablet or a smartphone as well. When users enter a pre-defined area such as pre-defined area 10.1 or pre-defined area 38 (See FIG. 3) an image can be generated for this user for a third electronic device As shown in FIG. 2A there are different electronic devices such as first device 15, third device 30 and another portable electronic device such as a smartphone hereinafter known as an additional device 36. As indicated in FIG. 1, one user such as a user/attendant 14 who may be in charge of authenticating a person, could hold a first electronic device such as a tablet. Another user such as user 32 or user 42 could then be authenticated by holding up his or her electronic device. Then the user/attendant 14 could determine whether the optical character(s)/picture on the first device 15 match the optical character(s)/picture on either the third device 30 or additional device 36.

For example, as shown in FIG. 2A there is shown an optical character 17 which matches with optical character 31 on screen 32. Alternatively/and/or simultaneously optical character 17 can be matched with optical character 38a on screen 37 of third device 36. When the user/attendant 14 determines that these two optical characters match, the user or user/attendant 14 can then allow entry for a party. Thus, in this situation, a user or guard who is guarding a port of entry can from a distance be able to authenticate users who wish to gain entry to a region through an opening or a port.

Figure 2C:
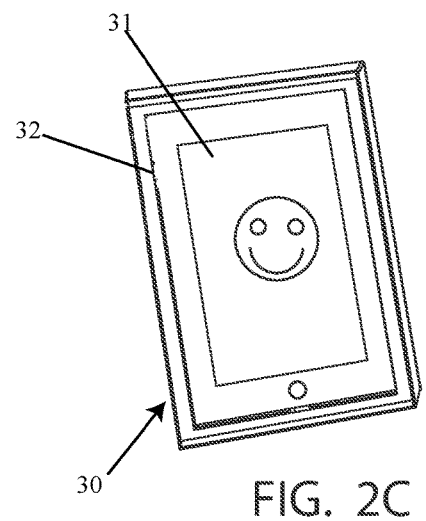
FIG. 2C is a third view if a matching computing device

FIG. 3 shows another plan view of a port of entry which shows entry via foot traffic. With this design, there is a station 12, an attendant 14 and a first electronic device 15 as indicated in FIG. 1. In addition, there is a first barrier or wall 20, a second barrier 21 as well as dividers 29.1 and 29.1. A plurality of gate drives 22.1 and 22.2 are configured to drive associated gates 24.1 and 24.2. A geofenced location is created including a perimeter 38 and an inner area 39. The geofenced area 39 can be created by a predefined area created by GPS coordinates or by a predefined area used through cellular or WIFI triangulation. Alternatively, the geofenced area 39 can be a combination of the pre-defined GPS coordinates as well as the WIFI or Cellular triangulation to create a predefined location. Once a user such as any one of users 42 (42.1, 42.2, 42.3, and 42.4) enters the predefined area 39 the user is then eligible to receive the pre-determined code or graphic such as a graphic shown in FIGS. 2A-2C. This could include any one of graphics 17, 31, or 38A-38D. In addition, the attendant such as attendant 14 having electronic device 15 can be located in a predefined area such as a geofenced area as described above, this predefined area or geofenced area could be contiguous with the geofenced area 39 or separate from it such as in area 49 formed by perimeter 48. In this embodiment, the pre-defined area is separate and shown by area 49 bound by perimeter 48. Once the user enters the second predefined area 26 defined by perimeter 25, the user's device notifies a server such as any one of servers 51 that the user has entered the restricted area. Once the user is in a restricted area, the user would no longer receive or be eligible for that particular image such as image 17 or image 31. In at least one embodiment, the different users 42.1, 42.2, 42.3, or 42.4 would only receive an identifying graphic such as graphic 17, 31, or 38A-38D once the users entered the geofenced area 39. By only distributing the identifying graphic when the users are in the geofenced area 39, this would then reduce the incidence of fraud by different users 42 by limiting the region in which these users have access to the image.

FIG. 4 shows a computer network 50 that can be used to allow a user such as user/attendant 14 to authenticate other parties or users such as users 32 and 42 using devices 30 and 36. For example, there is a central server 51 which can be a single server or a cluster of servers such as a video server 52, an application server 53, and a database server 54. This server 51 or cluster of servers are positioned behind firewall 55 and are in communication with GPS 60. Through firewall 55, server(s) 51 communicates through a computer network such as the internet 56 to other portable devices such as third device 30, a additional device 36, a first device 15 and a separate computing device 18.

Separate computing device 18 can be in the form of a computer terminal which is configured to allow data entry to register users, control servers 51 or upload new applications into application server 53 or data into database server 54 or images or video into video servers 52. This server array or cluster of servers 51 can be in communication with a GPS satellite such as satellite 60 or the portable devices such as third device 30 and additional device 36 or first device 15 can be in communication with GPS satellite 60 as well. For purposes of explanation the term system includes at least the components shown in FIG. 4 including but not limited to the server(s) 51, the first device 15, the additional devices 30 and 36, other portable devices 40, 44, and 48 (See FIG. 11) and any other additional components such as short range transmitters 150 (See FIG. 7), or scanners/camera 153 (scanner 153a, camera 153b). For purposes of Geofencing or geolocation the GPS satellites 60 can be used to establish a location of the electronic devices while the WIFI emitters 61, the cell towers 62 and/or the Bluetooth® emitters 63. For example, computing device 18 or application server can outline a pre-defined area for geo-fencing. Then the area including a perimeter for geofencing is established and then translated into a set of GPS coordinates, or WIFI triangulation signal(s) or cell tower triangulation signal(s) or a signal from a Bluetooth® emitter 63. Once a person steps inside and/or enters this area that person is now eligible to receive the graphic communication such as image or optical character 17 or 31, or images or optical characters 38a, 38b, 38c, and/or 38d.

Figure 5A:
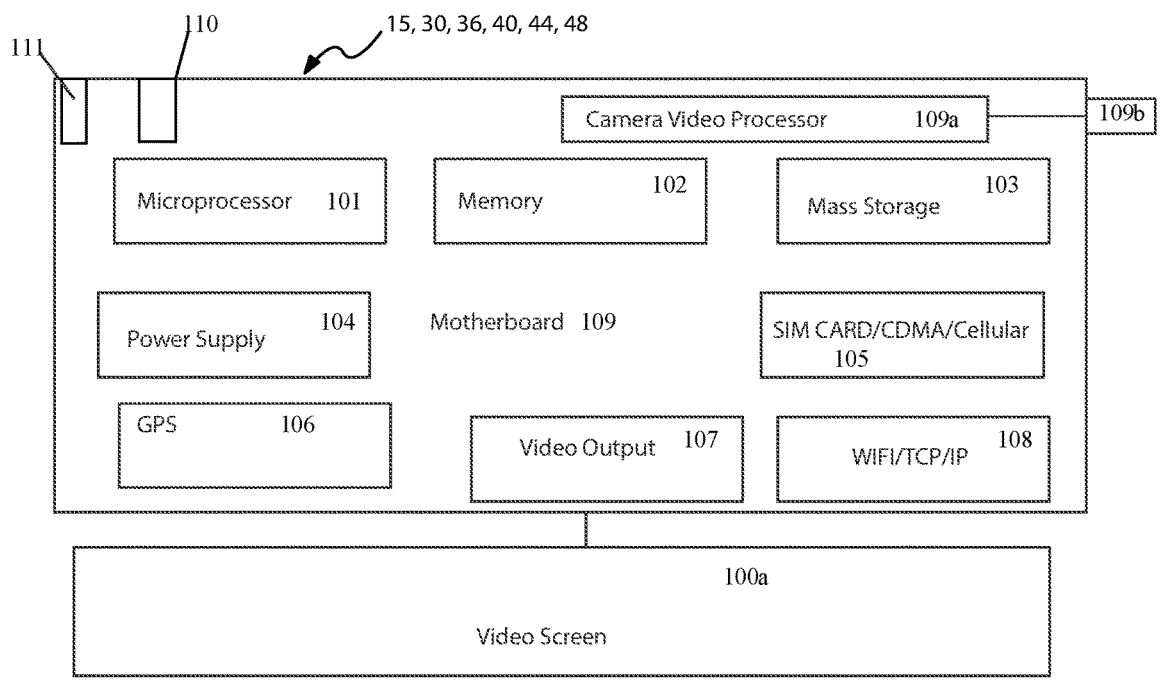
FIG. 5A is a schematic block diagram of a first type of computing device.

FIG. 5A is a view of one type of portable device such as a first device 15 or a portable electronic device such as third device 30 and additional device 36. In this view there is a microprocessor 101, a memory 102 (RAM), a mass storage device 103 (ROM), a power supply 104 such as a battery, a cellular card such as a SIM card 105, a GPS communicator 106, a video output 107 chip/processor which outputs video images to a video screen 100a. A transceiver 108 which can be in the form of a WIFI chip is also present on motherboard 109. There is also a camera processor 109b and a camera 109a which are coupled to the motherboard as well. In addition, there can also be a microphone 110, and a speaker 111 as well. Each of these chips/components can be coupled together to communicate data and power to each other on motherboard 109.

Thus, each of these components can be present in the portable electronic devices such as any one of devices 15, 30 and 36.

Figure 5B:
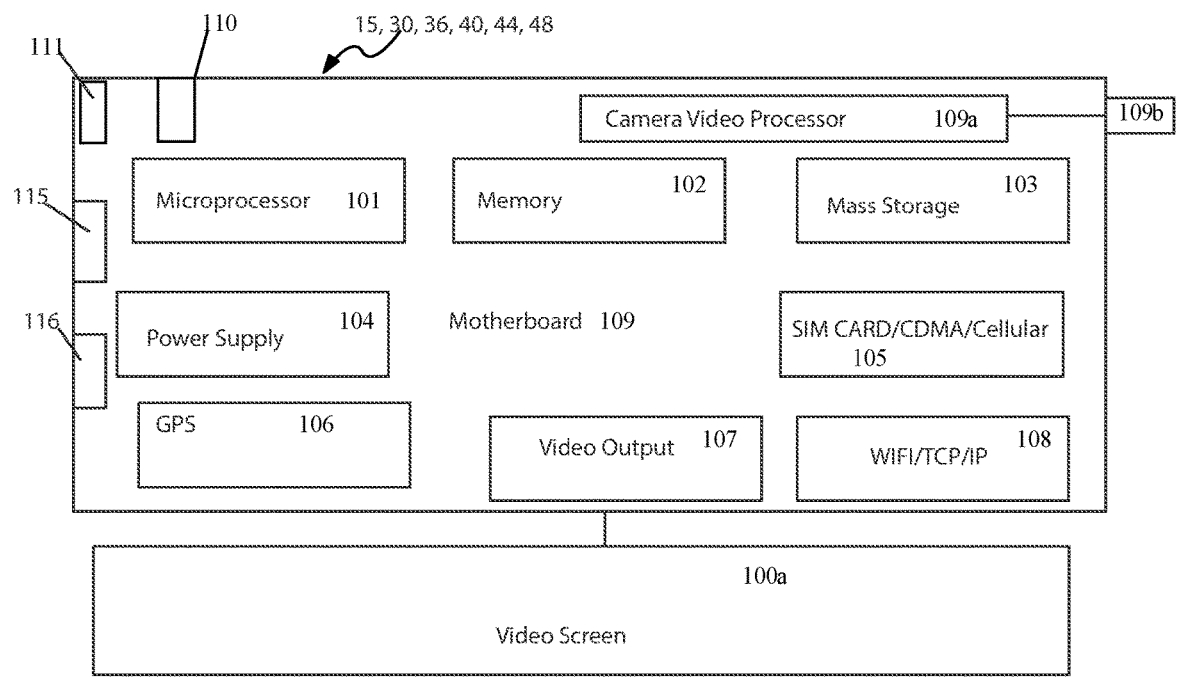
FIG. 5B is a schematic block diagram of a second type of computing device.

FIG. 5B is another version of an electronic device which includes all of the components shown in FIG. 5A but also includes one or more additional short range authentication chips. For example, there can be any one of a Bluetooth® chip 115, and/or a nearfield chip 116 as well.

Figure 6A:
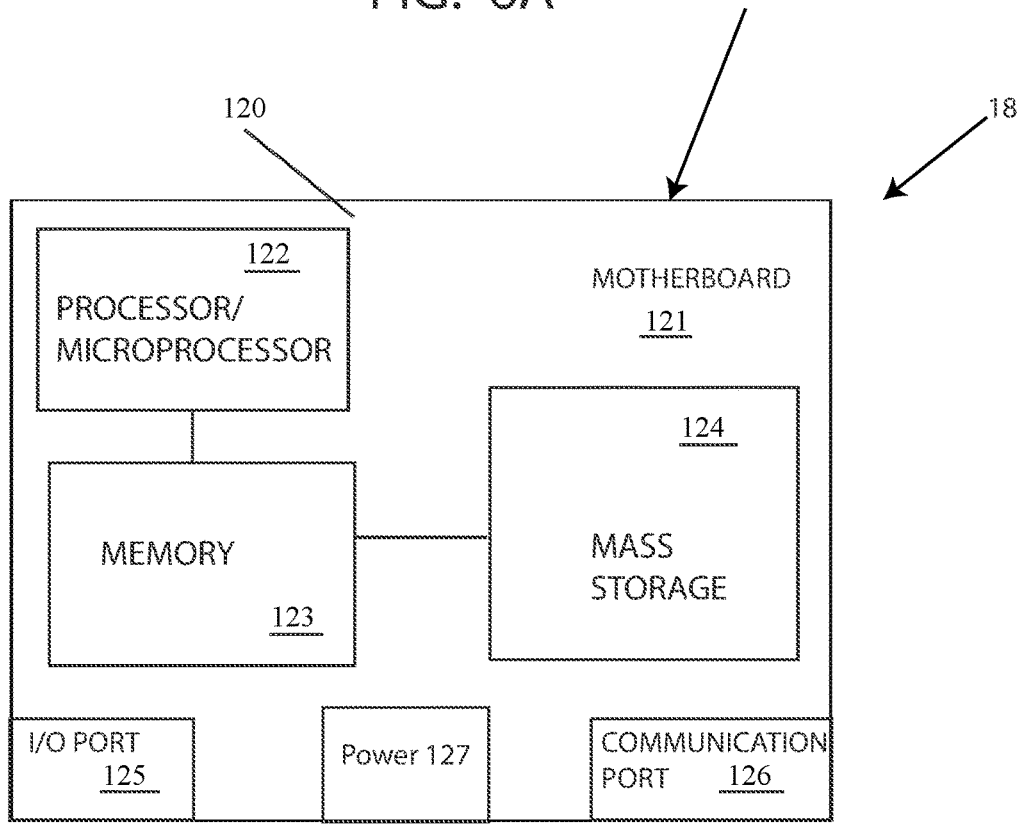
FIG. 6A is a schematic block diagram of a third type of computing device.

FIG. 6A shows a layout for a computing device 120 such as a server such as any one of computing device 18 and/or server or server array 51. 52. 53. And/or 54. In this view there is a motherboard 121, a processor such as a microprocessor 122, a memory 123, a mass storage device 124 coupled to motherboard 121. In addition, there is an input/output port 125 a communication port 126, and a power supply 127 which supplies power through the motherboard 121 to the rest of the components. These components along with the components of the portable devices 15, 30, and 36 as well as the components of the computing device 18 are used to perform the steps shown in FIGS. 12-15.

Figure 6B:
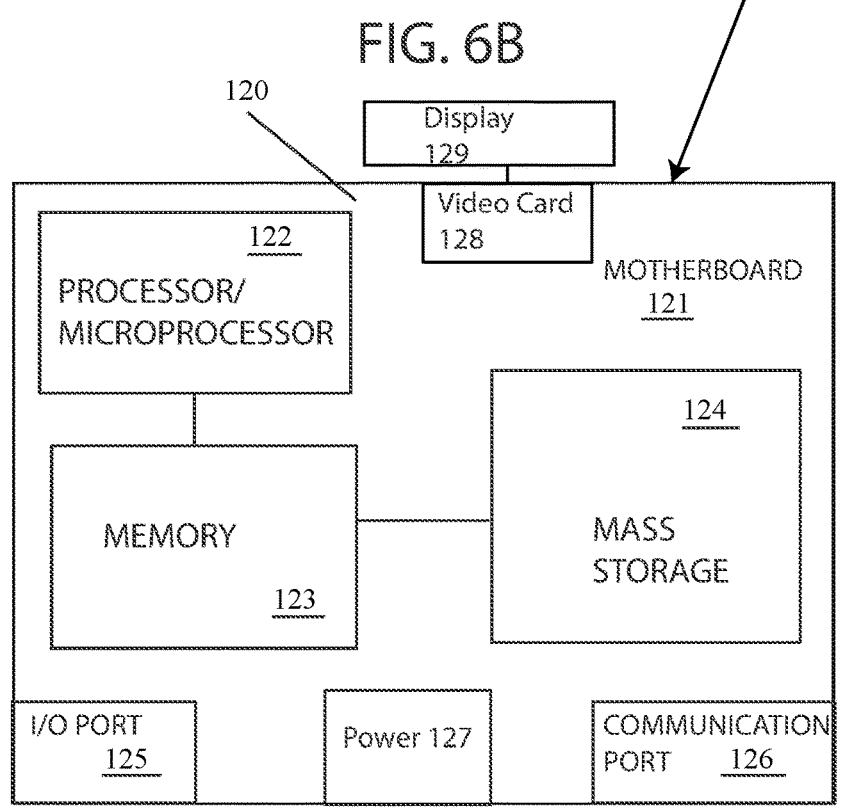
FIG. 6B is a schematic block diagram of a fourth type of computing device.

FIG. 6B shows a schematic block diagram of the components that relate to the computing device 18. These components include similar components described above in FIG. 6A but also include additional components of a video card 128 and a video display 129 for further data entry. While the servers of FIG. 6A can also include a video card, and display since these are servers, the video card 128 and the display 129 are not necessary.

FIG. 7 is a plan view of another embodiment 10*a* which includes a station 12, an attendant 14 having a first electronic device 15 for controlling whether to allow access to other users such as user 32 and user 42. The attendant can control who enters a region such as region 26, which is bound by at least one wall 20, at least one gate drive 22, and at least one gate 24. Alternatively gate 24 can simply be an extension of a barrier or wall 20 as well. In addition, coupled to gate 24 is an additional electronic device such as a short-range transmitter such as a Bluetooth® or nearfield communicator 150. This short-range transmitter 150 can then be used to further authenticate the location of the user to a particular region. For example, the user could first be tracked as far as location via GPS. If GPS location is not as precise or possibly inaccurate, an additional location device such as short-range transmitter 150 can also be used. This short-range transmitter can either be used exclusively to locate the users 32 and 42 or be used in addition to the location monitoring of the GPS on the electronic devices of the users 32 and 42. An example of a geofenced location from a nearfield communicator is shown by location 70 which is outlined by perimeter 71. With this design, the beam from a nearfield communicator such as from communicator or transmitter 150 is then sent out in a directed manner to form a field or location 70 which can be formed entirely by a directed short-range transmission.

Figure 2B:
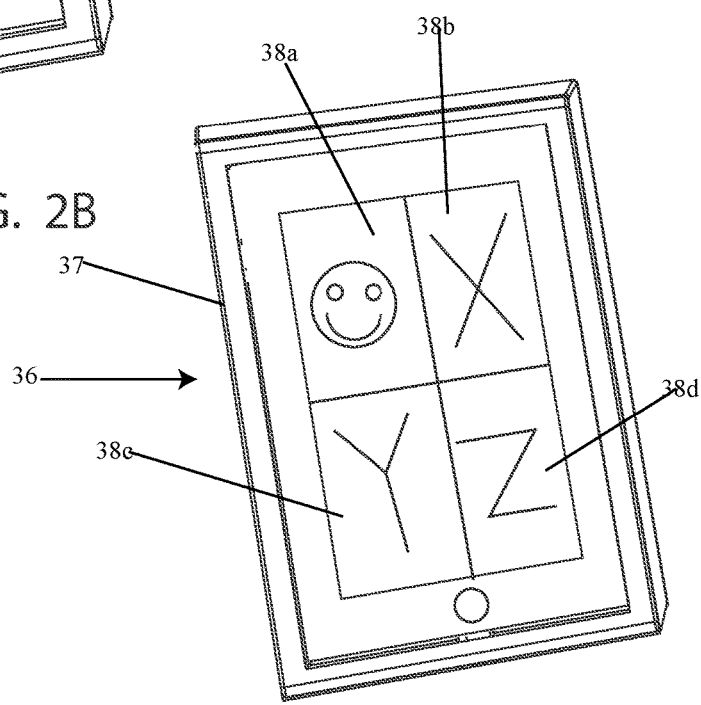
FIG. 2B is a second view of another matching computing device.

Once these users are located in a particular region, the server(s) can then send to the user 32 and/or 42 the authenticating graphic such as that shown in FIGS. 2A and 2B, so that the attendant 14 can authenticate and allow access to the other users to the region 26 while viewing the authenticating graphic from a sight distance of up to approximately 15-20 feet. At distances longer than 15-20 feet, the identifying image could be read by a scanner or other type of electronic reader such as scanner 153*a* or camera 153*b*. The authenticating graphic can be any graphic that allows the attendant to see it on a user's screen of their electronic device from a pre-set distance such as 30 feet or approximately 10 meters, 60 feet or approximately 20 meters, or even approximately 100 feet or approximately 30 meters. The authenticating graphic can extend over such a wide area on a user's screen that it can be clearly visible over these distances letting the attendant 14 know that the other user such as user 32 or 42 has pre-paid his entrance fee to the area 26. The authenticating graphic such as graphic 17, 31 or 38*a*-38*d* can be any suitable graphic such as a cartoon character, a shape, a design or any other suitable identifying characteristic. The color of the authenticating character can also be used for authentication purposes.

Figure 8:
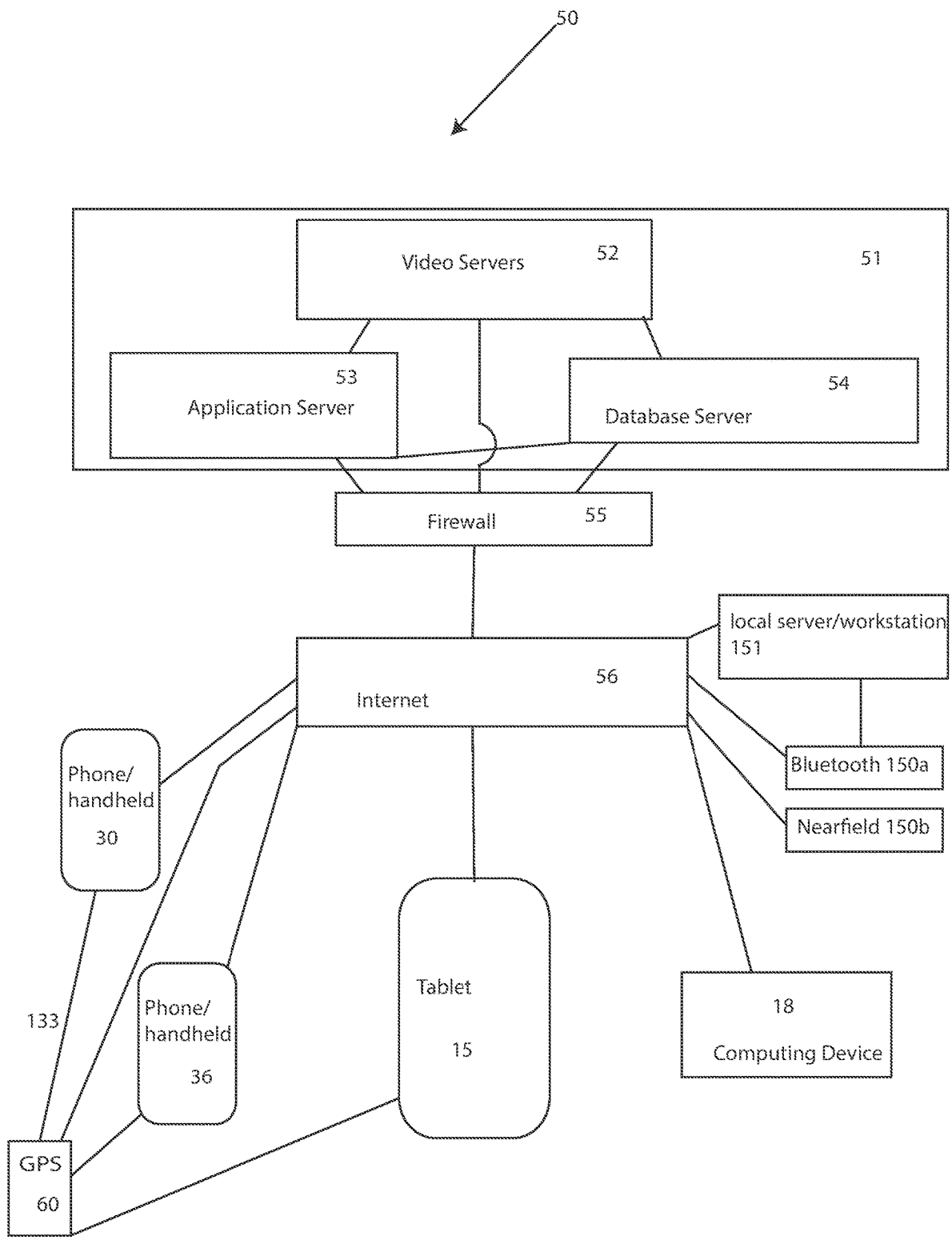
FIG. 8 is a schematic block diagram of another network.

FIG. 8 shows the schematic block diagram of the computerized network that can be used to authenticate the user as well. This design is similar to the computer network set forth in FIG. 3. However, with this design, there is short range transmitter 150 which is coupled to the network as well. When the user's device such as device 30 or 36 connects to this short range transmitter such as transmitter 150, the user's device 30 or 36 can then send a signal through the network such as through the internet 56 to provide location information about the user to the network, and thereby to any one of the server(s) 51. Once the location of the user is authenticated and the server(s) also authenticate that the user(s) have a right to valid admission to a region 26, then server(s) can send the authenticating graphic to both the attendant's device as well as to the associated user's device.

Figure 9:
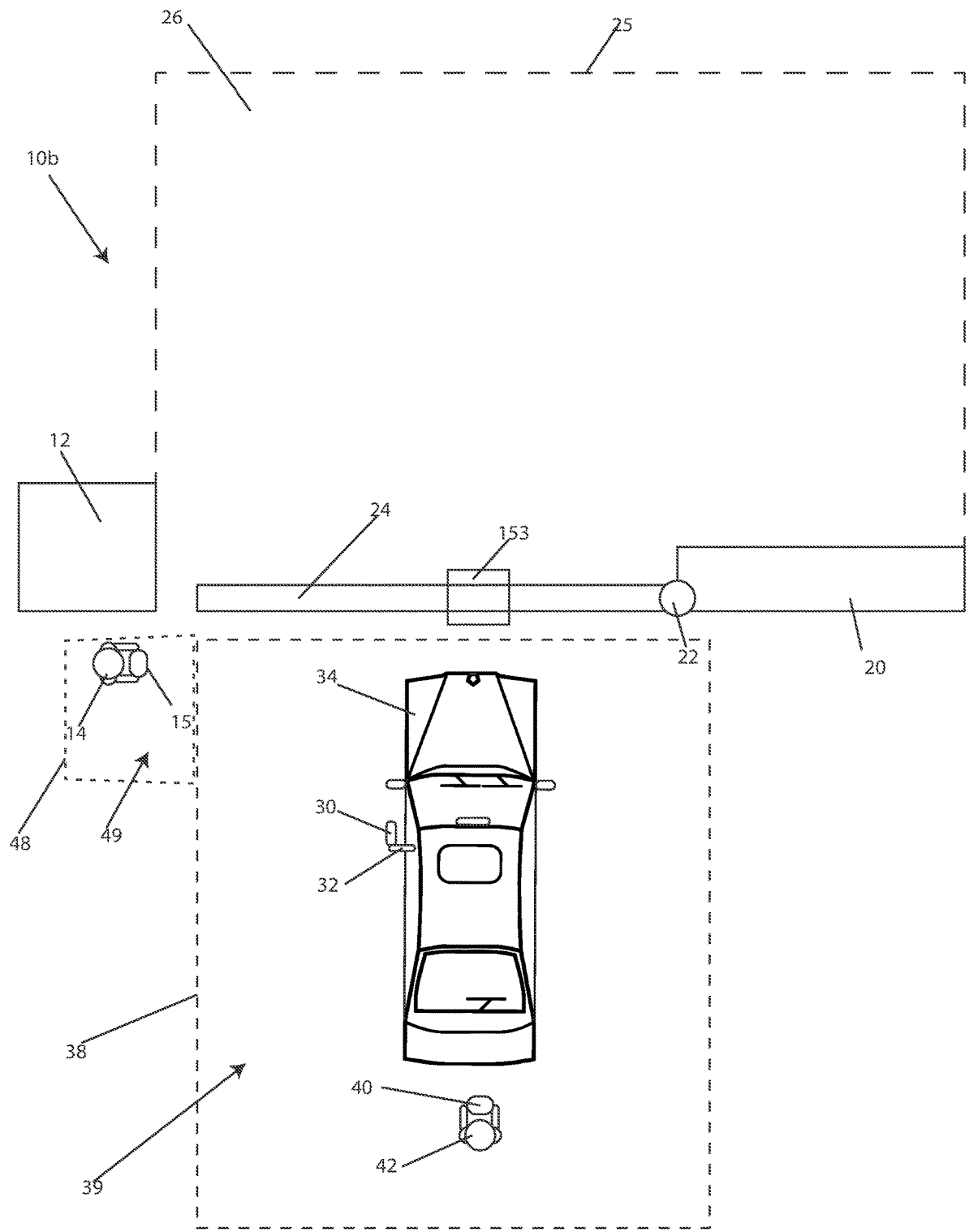
FIG. 9 is a plan view of another embodiment indicating a port of entry.

FIG. 9 shows another plan view of another embodiment 10*b* for authenticating a user to a particular area. For example, with this embodiment, there are all of the same components as shown in FIG. 1, however this embodiment discloses that there is at least one camera or scanner 153 which can be used to allow a user such as user 32 or 42 to authenticate their location as well as communicate with an attendant such as attendant 14. For example, a user such as user 32 having second electronic device can come in range with scanner 153 and authenticate his or her identity and/or location by presenting an image to the scanner or camera 153. Once the image is presented to the scanner or camera, the user's identity and location is established. If a scanner is used, the user's information can then be exported from the scanner 153 to a server(s) 51. If a camera is used, then the authenticating graphic can be transported from the camera to the attendant's device. If the authenticating graphic matches on the attendant's device then the attendant can let the user into the pre-defined area 26. In this view there is geofenced location 39 formed by perimeter 38 as described above.

Figure 10:
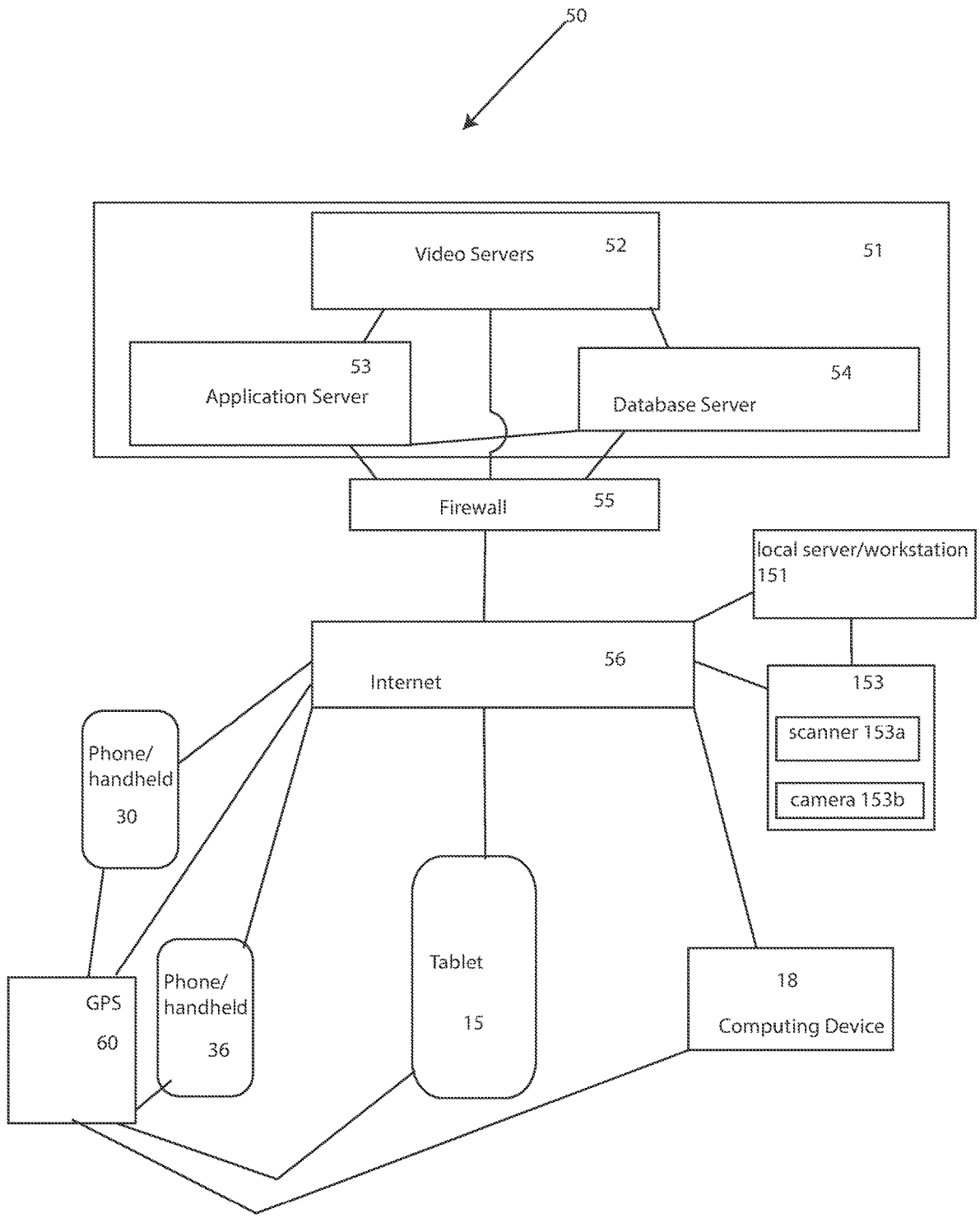
FIG. 10 is a schematic block diagram of another network.

FIG. 10 shows the computer network which is associated with this embodiment. In this view there is a scanner or camera 153 which is selectively coupled to either the local server/workstation 151 or to the server(s) 51 via a network connection through the internet. The scanner/camera 153 can be in communication with these designs either wirelessly or in a wired manner.

Figure 11:
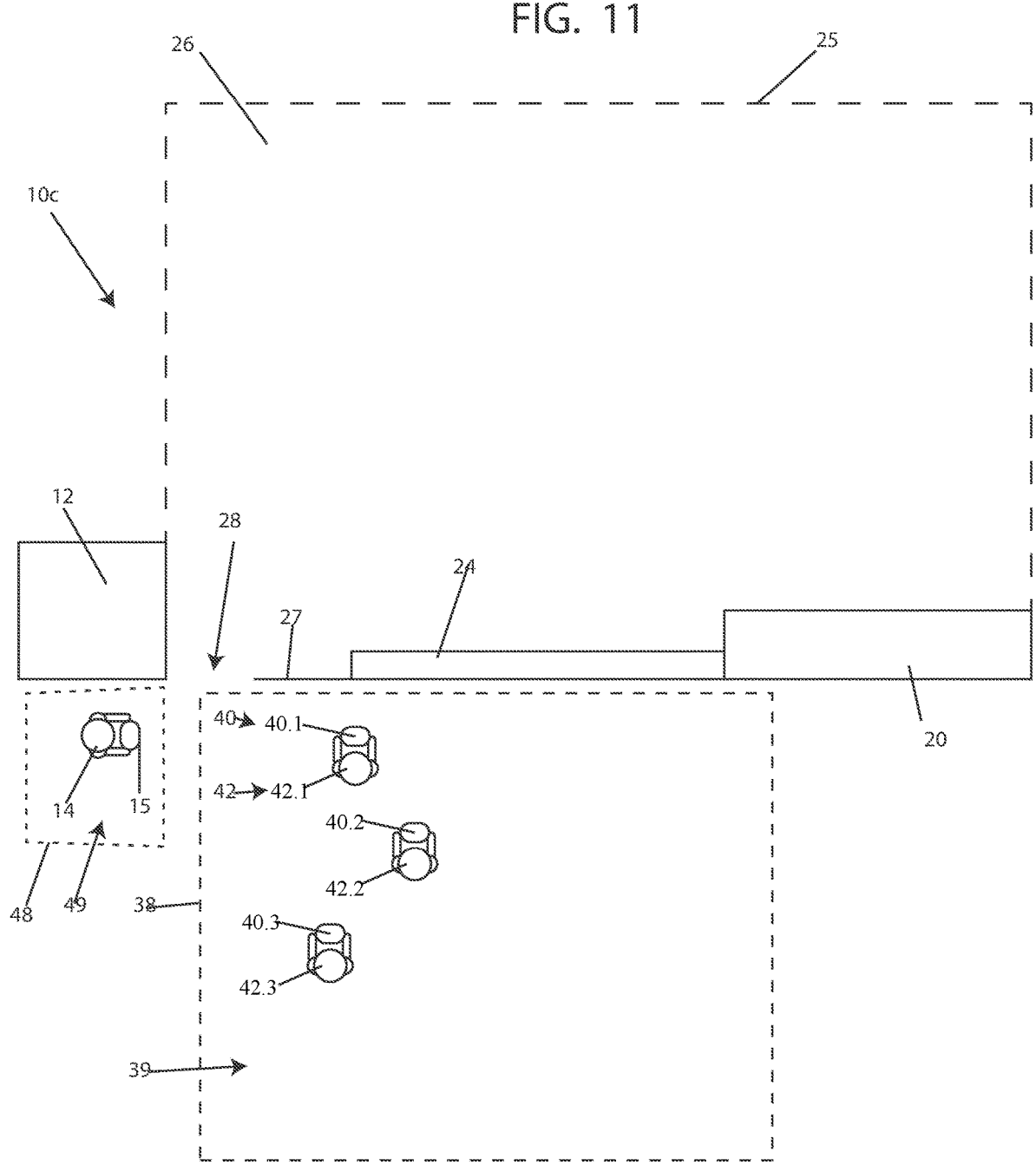
FIG. 11 is a plan view of another port of entry.

FIG. 11 shows another embodiment 10*c* which shows users 42, 46 and 49 assembling to enter area 26 via an opening 28 in a closed off portion 27 such as a wall or barrier. With this design, there can be groups of people such as users 42, 46 and 49 who all can be authenticated at the same time by simply showing the authenticating image or graphic on their associated electronic device 40.1, 40.2, and 40.3, to the attendant 14. If these authenticating images or graphics on each of the user's machines are verified by the attendant 14 then the attendant can let the group of people into the area 26. In this view there is geofenced location 39 formed by perimeter 38. In this region, there are electronic devices 40 including devices 40.1, 40.2, and 40.3 which can be associated with parties 42.1, 42.2, and 42.3 respectively.

Figure 12A:
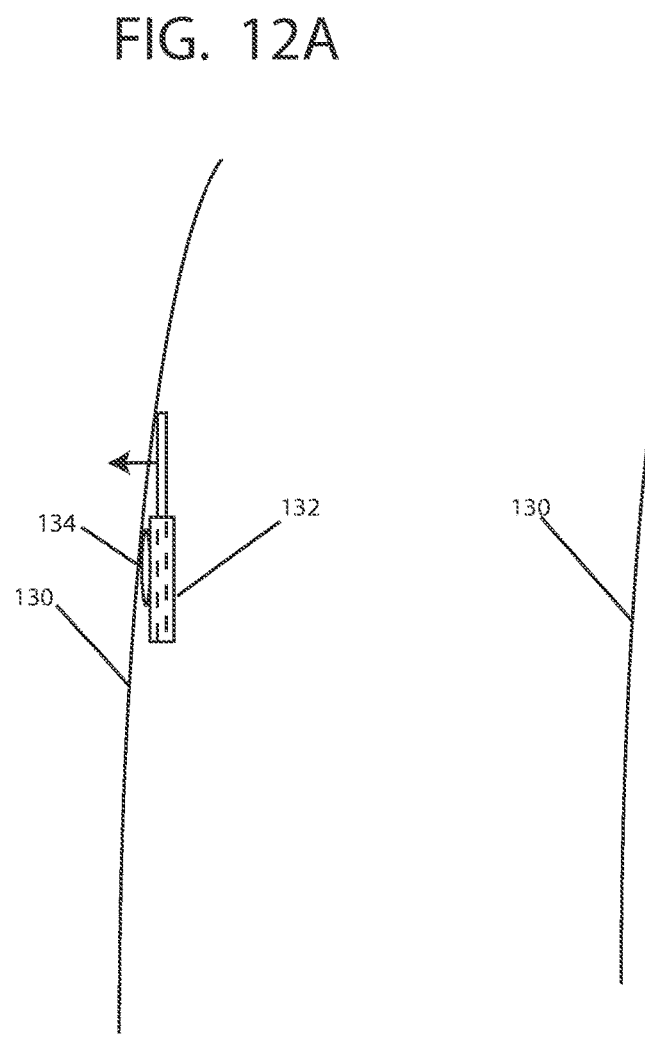
FIG. 12A is a side view of a window and a holder.

FIG. 12A is a side view of a window such as a window for an automobile. With this view, a holder such as holder 132 can be secured to a window 130 via a fastener such as via a suction cup 134. With this view an electronic device such as any one of an electronic device 30 and/or 40, can be inserted into the holder such that once it is inside of holder 132 it can face out towards the window and present an image to an attendant. This is shown in FIG. 12B wherein as shown there is holder 132 with suction cup 134. As shown, image 17 is shown on electronic device 40, thereby presenting an authenticating image to an attendant.

Figure 12C:
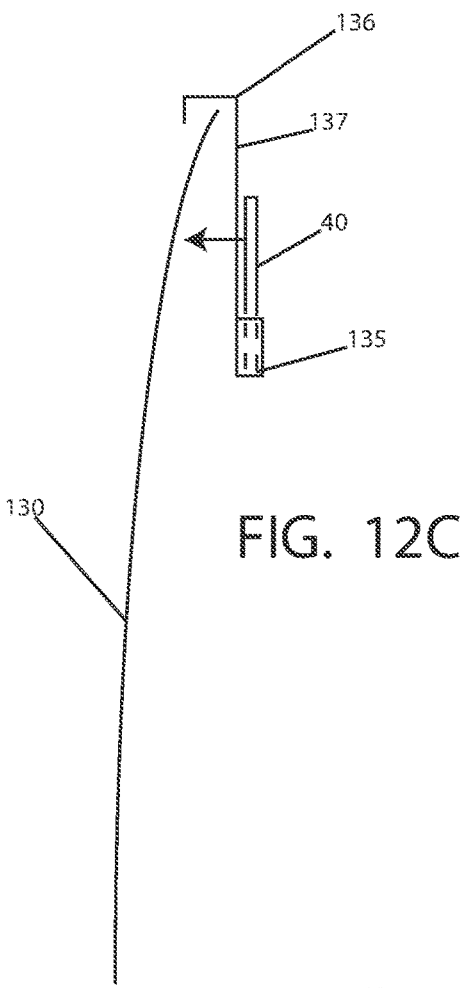
FIG. 12C is a side view of a window and a holder.
Figure 12B:
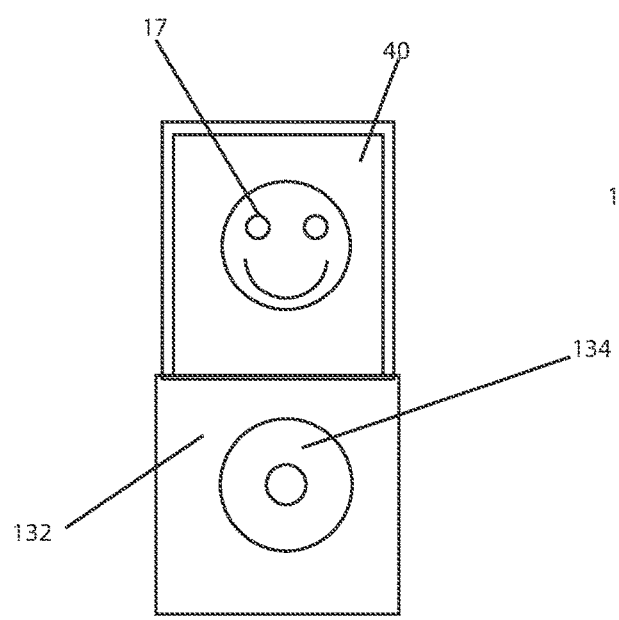
FIG. 12B is a front view of the device and a holder of FIG. 12A.
Figure 12D:
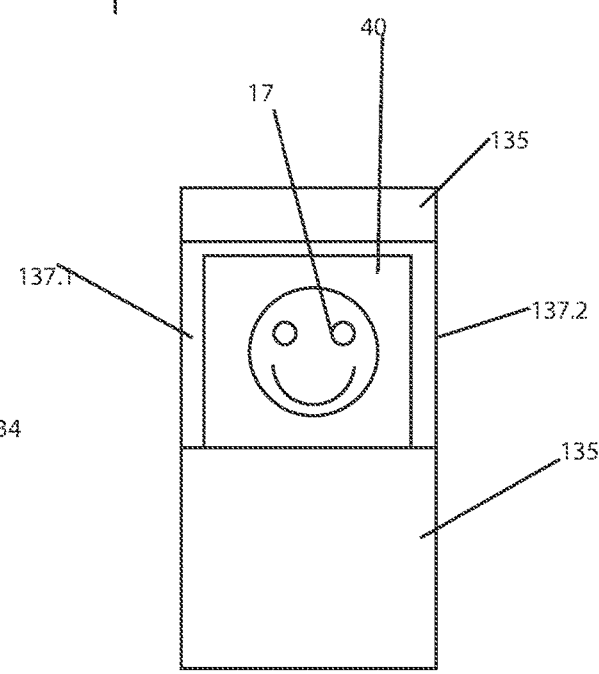
FIG. 12D is a front view of a window and a holder.

FIG. 12C shows an alternative embodiment wherein in this embodiment there is shown a holder 135 having a fastener 136 which is coupled to the holder 135 via arms 137. Thus, with this design, fastener 136 forms a U-shaped clip which clips over a window and allows the holder 135 to hang from the window. Thus, the window can be rolled up and the holder 135 can hang from the window thereby presenting the face of the electronic device such as face 17 to the attendant. FIG. 12D shows a view of the holder 135 which shows arms 137.1 and 137.2 on either side of the face 17 which allows for the visual recognition of the graphical image 17. Thus, a user or attendant can in a standard way present these images to an attendant on a substantially regular basis thereby allowing the attendant to easily see the generated graphical image 17.

Figure 13:
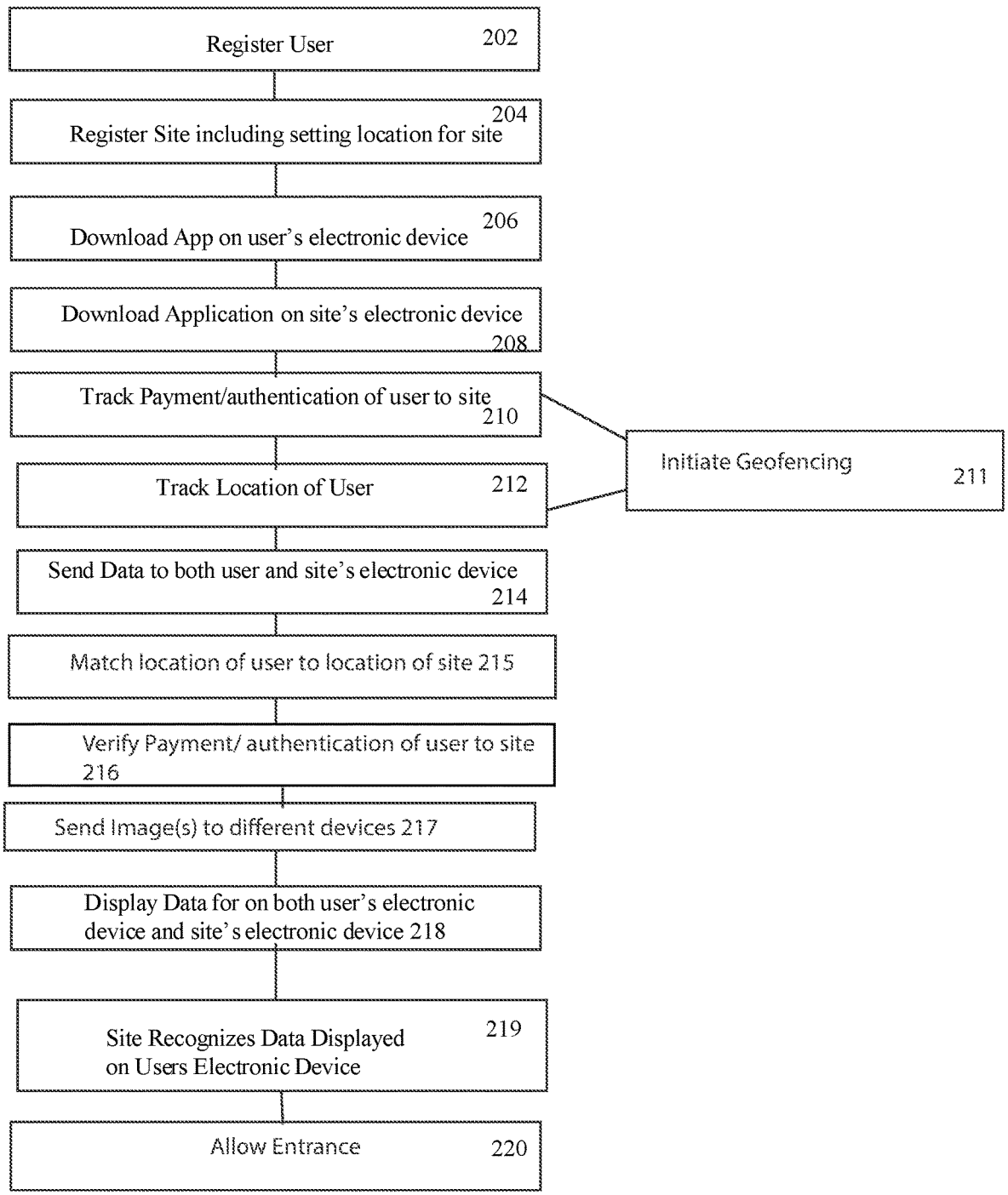
FIG. 13 is a flow chart of the process for admitting people into the port of entry.

FIG. 13 is a flow chart for the process for authenticating a user. For purposes of the flow chart, much of the processes are carried out using a microprocessor 122 on any one of server(s) 51, or microprocessor 101 on any one of devices 15, 30, 36, 40, 44, and 48. For example, in step 202 the user can register to the system such as to a server 51. With this step, the user's identity and contact information is input into a database in the system. In addition, a particular site or location can also be registered. This site could be for example the site shown in FIG. 1. With this registration, the user could input the location of the site, the price for admission and any other suitable identifying information as well. Next, a user such as any one of users 32, 42, 46 or 49 could download a coordinating application on their respective devices in step 206. In addition, the attendant such as attendant 14 could also download an associated application on their device in step 208 as well. In step 210 the system could track the payment/authentication of the user to the site. Next, in step 211 the system could initiate geofencing. The initiation of the geofencing could be by uploading coordinates to track users via GPS, or uploading a pre-set range for reading on a WIFI via WIFI triangulation or uploading a pre-set signal for reading from a cellular tower or cellular network. Thus, the user's personal electronic device such as device 30 or 40 would be triggered to interact with a server such as server 53 to selectively download an authenticating image once the user's personal device was found to be in range of the geofencing location. The user's personal device such as device 30 or 40 would have a pre-set set of triggers downloaded to an app (application) on the user's personal device. Those triggers could be GPS coordinates, a set of triangulated WIFI signals, a set of triangulated cellular signals and or a signal from a nearfield device.

Next, once the user is within the geofenced location, the system can track the location of a user in step 212 either through GPS tracking of the user with his or her associated electronic device, or through the user's associated electronic device the user could further authenticate their location through a short range communicator 150 such as a near field communicator or a Bluetooth® communicator or by the user having an associated camera or scanner read an image on their associated electronic device such as a bar code. Next, in step 214 the system can then send the data of both the user's location and if necessary, the site's location to the server such as server(s) 51. Next, in step 215 the system can then match the location of the user to the location of the site. Next, the system can then authenticate whether the user has paid for admission to that site in step 216. Next, in step 217, the system such as server(s) 51 can transmit corresponding images to the attendant's device 15 as well as to one or more of the associated user's devices 30 and 36 for example. Next, in step 218, this information is displayed on the associated electronic devices. When the attendant recognizes that there are corresponding images on both the attendant's device 15 as well as on the users' devices 30 and 36, in step 219, the attendant or the site can allow these associated users to enter in step 220. This could occur through the attendant 14 pressing a button to move gate 24 via drive 22 to open the associated gate.

Figure 14:
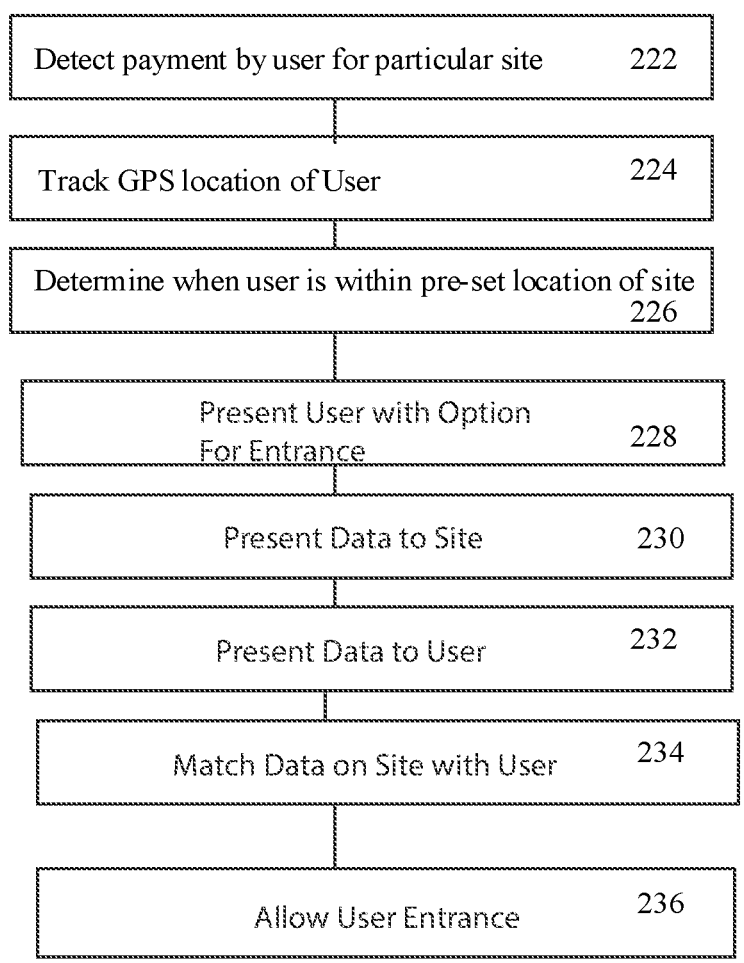
FIG. 14 is a flow chart of the process for admitting a person to a port of entry.

FIG. 14 is an alternative more simplified process for authenticating a user to a particular site. For example, the process starts in step 222 wherein the system can detect a payment by a user for a particular site or location such as a national park. Next, in step 224 the system can track the location of the user using GPS on the user's portable electronic device such as any one of electronic devices 30, 36, 40, 44, and 48. Next, in step 226, the system can determine whether the user is within a pre-set location such as a geofenced location as indicated above, such as in a vicinity of a check in station 12 which is attended by an attendant 14 having a device 15. Next, in step 228, the system can present the user with an option for gaining entrance to the area. If the user elects that they want to gain entrance to the area thereby redeeming their ticket or purchase, the system would forward data to the site which would be forwarding data (if necessary) to the attendant's device 15. This data could be in the form of an authenticating graphic or image which is forwarded to the user's device. In addition, the system would also present data to the user in step 232 so that the user could reveal the authenticating graphic to the attendant.

Next in step 234, the data displayed on site on the attendant's device 14 in the form of the authenticating graphic is matched with the authenticating graphic on the user's device such as any one of devices 30 or 36, 40, 44, or 48.

At this point the attendant upon matching the authenticating graphic the attendant 14 can allow the user into the area such as area 26.

Figure 15:
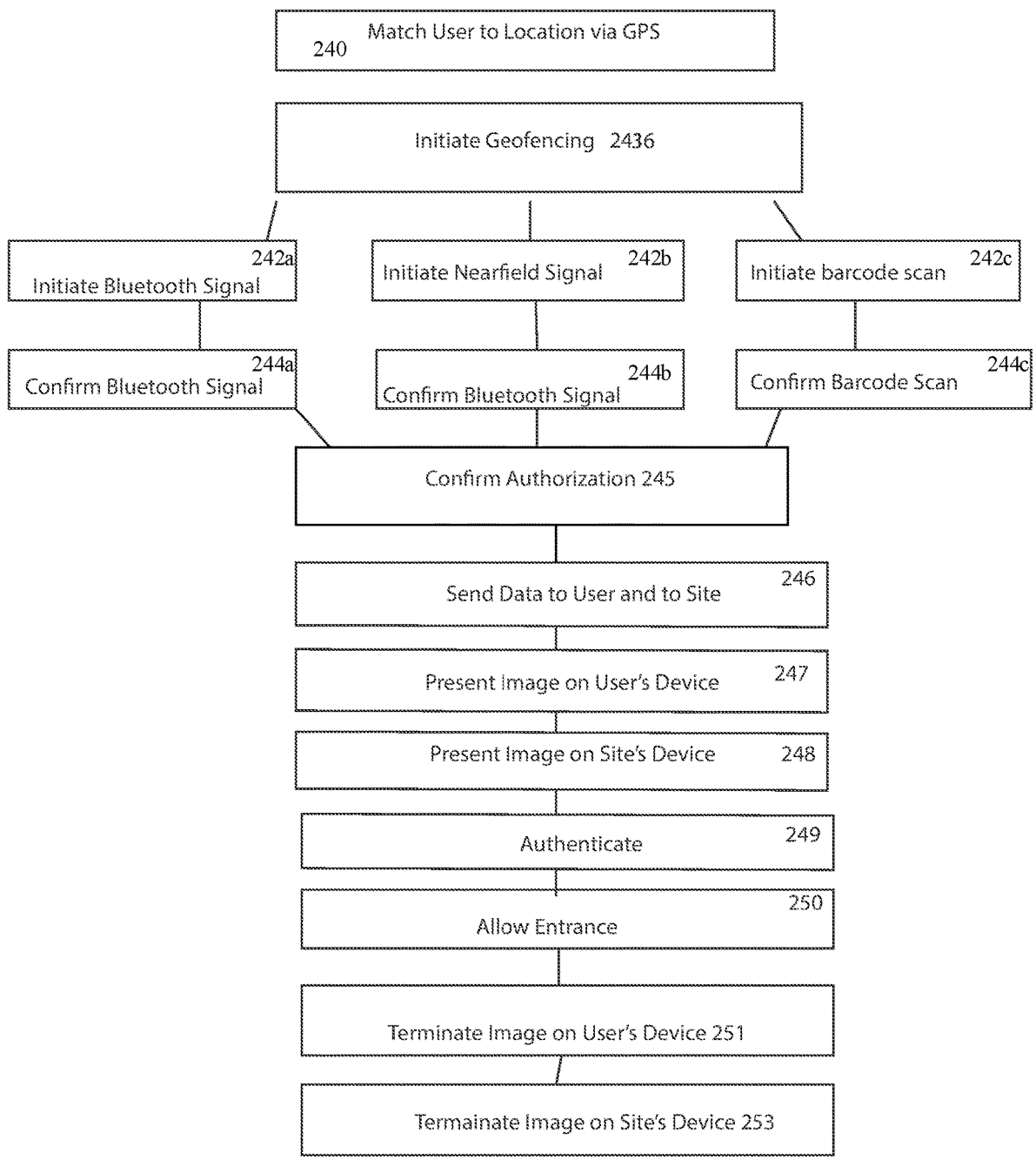
FIG. 15 is a flow chart of the process for admitting a user using additional verification.

FIG. 15 shows the expanded steps that are associated with tracking the user's location with respect to a site. This set of expanded steps relates to step 212 of FIG. 12 and step 224 and 226 shown in FIG. 13. For example this process starts in step 240 wherein the system scans and identifies the user's location via GPS coordinates being sent from the user's portable device such as devices 15, 30 or 36, 40, 44, or 48. At this point the system would have in its database or at least in its memory the location of the attendant and a location of each user relative to the attendant or the location of entry of the site such as site 26. Next, for further location authentication, the users such as attendant, or other users wishing to gain entry to the area or site 26 can further authenticate their location by either initiating and communicating via Bluetooth® in step 242*a* (with Bluetooth® device 150*a*), or initiating a nearfield signal 242*b* (with nearfield station 150*b*), or initiating a barcode scan in step 242*c* via scanner 151. If the user is connected using Bluetooth® signals in step 242*a* then the system can confirm the user in step 244*a*. If the user is connected using nearfield signals in step 242*b* then the system can confirm the user in step 244*b*. If the user is connected via an initial barcode scan, then the system can confirm the user in step 244*c*. Next, once any one of the server(s) 51 authenticates the GPS location and confirms that this location is within a particular geofenced location, the system then seeks further location confirmation outlined in steps 242*a*, 242*b*, and 242*c*, and respective steps 244*a*, 244*b*, and 244*c* it would proceed to step 245 where it would confirm that the user is authorized to enter via purchase of a ticket or a pass. Next in step 246, the system would send data to the user such as any-one of user's devices 30 or 36, 40, 44, or 48 and to the site device 15. Next, this data would appear as an authenticating image on the user's device in step 247. This image would also appear on the site's device 15 in step 248. In step 249, the attendant 14 would authenticate the user. Next, the attendant would allow the user to enter the site.

Figures 17A, 17B:
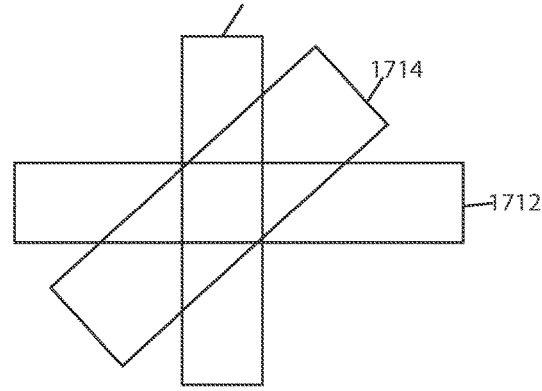
FIG. 17 is a chart of the characters that can be used for allowing users into a port of entry.

In order to ensure that each set of images are unique FIG. 16 shows one possible method for generating images. For example, FIG. 16 is a flow chart for determining which types of characters and how many characters to use. The process starts with step 1601 wherein the system determines the number of average participants for an event. The number of participants for an event would then be a determining factor in deciding how many different characters to use for visible authentication. For example, if there were more participants the system could automatically select a larger number of authenticating figures. This way, other users who would see adjacent users with a verifying character could not automatically duplicate this character to subvert the access process. Next, in step S1602 an administrator can select a location of an entrance for authentication. The location of the entrance could be a determining factor on which characters to use and the visibility of those characters. Next, in step 1603 the administrator could determine or select the time of day for presentation of the characters. The time of day that these characters are presented would play into which type of characters are selected as well as the colors of the characters. For example, if the characters are being presented in the day-time the color of the characters and the color of the background may be different than the color of the characters and the color of the background when these characters are presented at night. In addition, in step S1604 the administrator can select whether the weather or other environmental circumstances would affect visibility. Next in step S1605 the system can determine from a pre-set matrix 1702 (See FIG. 17A) the type of characters and the block of characters to select for authentication. For example, as shown in FIG. 17A there is a first block 1703 which is a first assortment of characters. Alternatively, there is a second block of characters 1705 which also shows a different assortment of characters as well. Depending on the need for which type of characters and the visibility type, the system or the administrator can select a block or set of characters for authentication. In addition, based upon the size or number of participants, the system can select a larger block of characters or a smaller block of characters as well. In addition, during this step, the system can also select based upon sliding scales as shown in FIG. 17B which types of color in sliding scale 1710, which type of background color in sliding scale 1714, and the size in sliding scale 1712 for easier review and authentication. The different blocks of characters can be of any type, particularly in one embodiment they can be alphanumerical, however in another embodiment they can be any array of complex or non-complex graphical images or pictures (see for example block 1705). The colors can be varied and they can be set to flashing or strobe or to emit a solid image.

Figure 18:
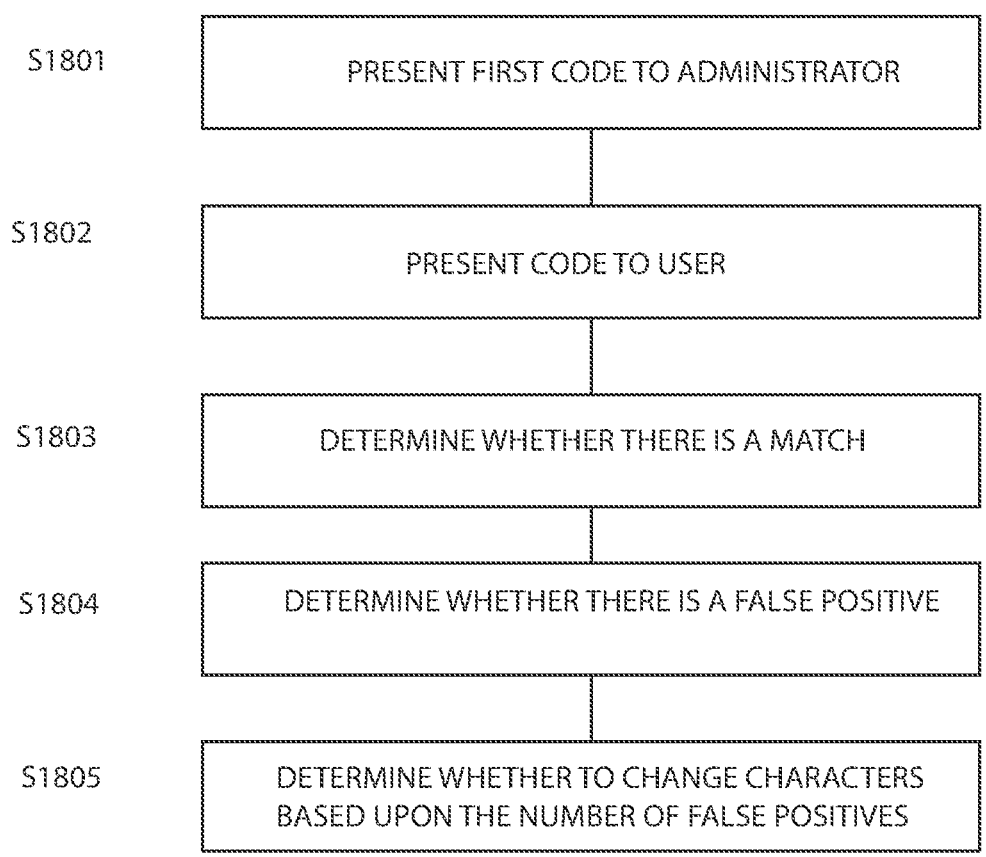
FIG. 18 is a flow chart for determining which characters to use based upon the likelihood of a false positive.

FIG. 18 shows a flow chart showing the process for determining whether to switch the characters to a different set of characters based upon the success of authentication and identification of the proper characters for entry.

For example, the process starts in step S1801 wherein after selecting the first block of characters as described above, the system can present a first code to an administrator, wherein the code is a character or a set of characters to be used for authentication. Next, in step S1802, the system presents a code to the user for allowing the user to be verified by the administrator. Next, in step S1803, the administrator can determine whether there is a match between the administrator and the user. Next, in step S1804, the system or administrator can determine whether there is a false positive reading between the administrator and the user. Next in step S1805 the system and/or the administrator can determine whether to change characters or groups of characters or characteristics of characters (color, shape size, etc) if there are a statistically significant number of false positive readings by the administrator. If there are a statistically significant number of false positive readings, then the system or the administrator can select a new block of characters from the matrix shown in FIG. 17A and/or a new set of characteristics from the sliding scale matrix shown in FIG. 17B. In this way the administrator and/or the system can then avoid any statistically significant amount of false positive readings in the future.

Thus, this system and process would allow a single attendant the ability to authorize entry of multiple users to a site simply by visual authentication using an image on the user's portable electronic device such as any one of devices 30, 36, 40, 44, or 48.

Once the user leaves the initial geofenced location, such as location 39 within perimeter 38 (See FIG. 3) and the user enters another location such as location 26, the system such as server(s) can terminate the authentication signal. Further, either on a time based basis, or on a numbers basis, the different authenticating graphical images can be changed or rotated so that other future entrants to an area do not learn of a particular graphical image to copy and use in future use.

Figure 19:
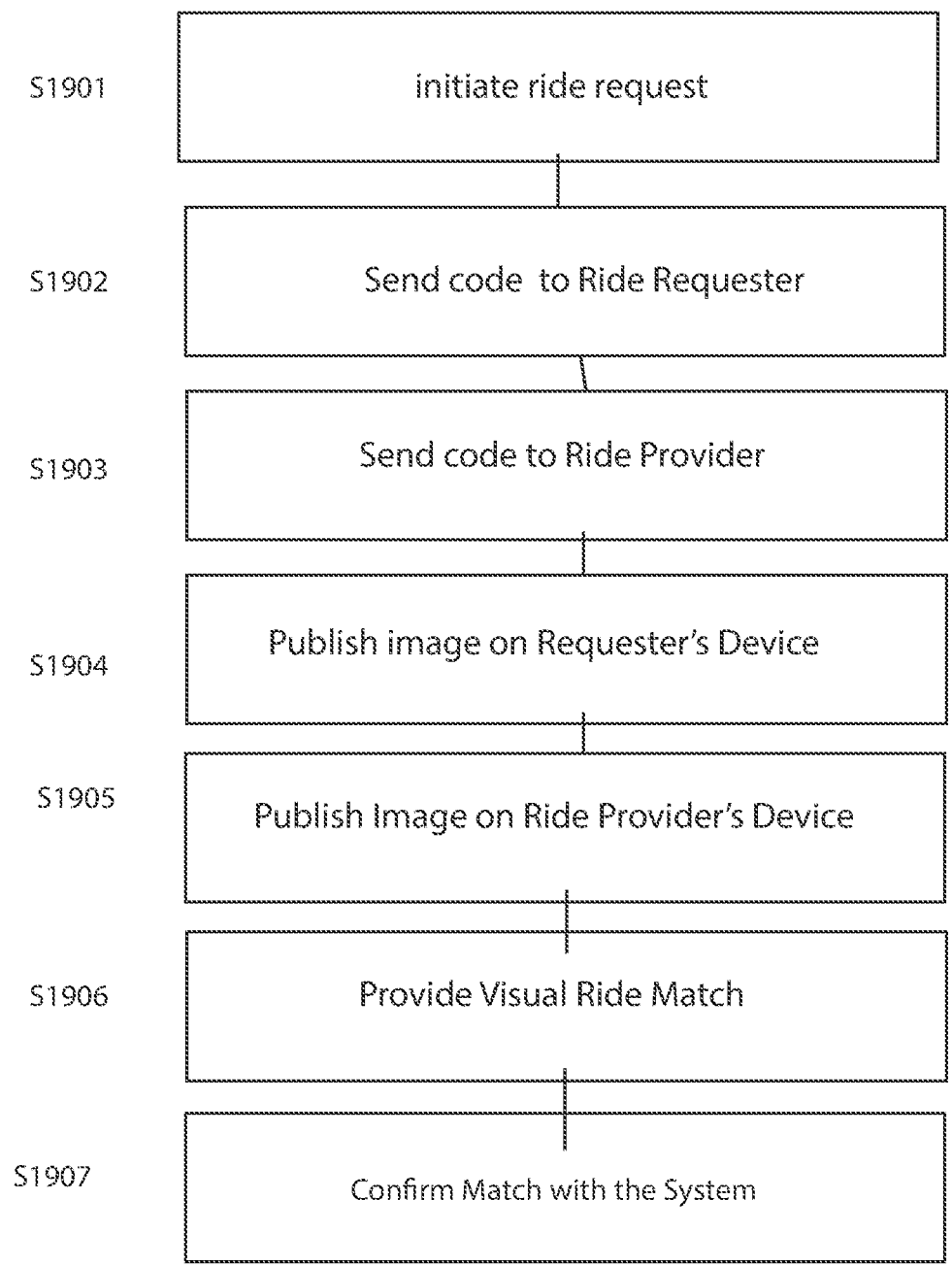
FIG. 19 is another view of another service using the system.

FIG. 19 is another view of another service using the system. With this process, a person ordering a ride service could use the system to match their request with a particular driver, to confirm the identity of the driver. This type of service could be particularly important to prevent misidentification of a driver for a ride service, thereby ensuring the safety of both the driver as well as the passenger. For example, the process starts with step S1901 wherein the ride requester initiates a ride request. This ride request could be using any known ride requesting applications known in the art. Upon initiating this ride request, the user's portable device such as a smartphone could automatically initiate an identification request in step S1902 with the system which would result in the system sending an identification code to the ride requester. Next, the system could send an identification code to the corresponding ride provider in step S1902. Next, in step S1904 the system could publish the image on the requester's device. Next, in step S1905 the system could publish the image on the ride provider's device. Once the ride provider is within a visual distance of the ride requester, the ride provider's image on the provider's portable device would match with the image on the ride requester's device in step S1906 thereby delivering a further authentication of the ride request. Furthermore, based upon either user sending a confirmation of a match, the system can then further confirm that both parties are matched together in step S1907.

Ultimately this system and process can be used to identify two different parties using a visual indication of an easily identifiable image to thereby match the two parties whether the system and process is used for entrance to a venue or for matching the two parties for a ride service or other types of known services.

Accordingly, while at least one embodiment of the present invention have been shown and described, it is to be understood that many changes and modifications may be made thereunto without departing from the spirit and scope of the invention as defined in the appended claims.

What is claimed is:

1. A system for identifying users for entrance to an area comprising:

a) a point of entry into a pre-defined area;

b) a first computing device having a microprocessor, a memory and a screen disposed adjacent to said point of entry;

c) at least one second computing device having at least one microprocessor and at least one memory, said at least one second computing device being disposed remote from said first computing device; and d) a third computing device having at least one screen and at least one microprocessor said third computing device being controlled by at least one user;

e) at least one location system, said at least one location system configured to locate said first computing device and said third computing device;

f) a camera, wherein said at least one first computing device is coupled to a camera, wherein when said camera identifies an image on a screen of said at least one third computing device as being an image that matches an image stored in a memory of said at least one first computing device, said at least one first computing device opens a port of entry in said pre-defined area;

wherein said third computing device is in communication with said at least one second computing device wherein said second computing device is configured to send at least one image to said first computing device and to said third computing device when said at least one third computing device enters a pre-defined area, and wherein when an image at the point of entry matches an image of said at least one user having a third computing device the at least one user is then let into the point of entry.

2. The system as in claim 1, wherein said at least one microprocessor of said at least one second computing device selects at least one image from said at least one memory and then forwards that image to both said at least one first computing device and said at least one third computing device to be displayed on a screen of said at least one first computing device and on a screen of said at least one third computing device.

3. The system as in claim 1, further comprising at least one gate, wherein said at least one gate extends across said point of entry into an area, wherein said at least one camera is coupled to said at least one gate.

4. The system as in claim 1, wherein said at least one first computing device is a portable computing device which is operated by a user controlling access to the point of entry.

5. The system as in claim 1, wherein said at least one first 1 computing device is a tablet computer.

6. The system as in claim 1 wherein said at least one first computing device is a smartphone.

7. The system as in claim 1, wherein said at least one gate comprises at least one drive wherein said at least one drive is operated by said at least one first computing device.

8. The system as in claim 1, wherein said at least one first computing device and said at least one third computing device each comprise a GPS communicator forming said location system, with each GPS communicator configured to transmit a location of each of said first computing device and said third computing device.

9. The system as in claim 3, wherein said at least one third computing device further comprises at least one Bluetooth communicator and wherein the system further comprises at least one additional Bluetooth communicator configured to communicate with said at least one Bluetooth communicator on said third computing device.

10. The system as in claim 3, wherein said at least one third computing device further comprises at least one near-field communicator and wherein the system further comprises at least one additional nearfield communicator configured to communicate with said at least one nearfield communicator on said at least one third computing device.

11. The system as in claim 1, further comprising a holder configured to attach over a car window, wherein said at least one third computing device is coupled to said holder.

12. The system as in claim 1, further comprising a scanner, and a gate, wherein said scanner is coupled to said gate.

13. A system for identifying users for entrance to an area comprising:

a) a point of entry into a pre-defined area;

b) a first computing device having a microprocessor, a memory and a screen disposed adjacent to said point of entry;

c) at least one second computing device having at least one microprocessor and at least one memory, said at least one second computing device being disposed remote from said first computing device; and d) a third computing device having at least one screen and at least one microprocessor said third computing device being controlled by at least one user;

e) at least one location system, said at least one location system configured to locate said first computing device and said third computing device;

f) at least one gate;

g) at least one scanner coupled to said at least one gate;

wherein said third computing device is in communication with said at least one second computing device wherein said second computing device is configured to send at least one image to said first computing device and to said third computing device when said at least one third computing device enters a pre-defined area, said scanner reads an image on said third computing device and wherein when an image at the point of entry matches an image of said at least one user having a third computing device the at least one user is then let into the point of entry.

\* \* \* \* \*